(12) United States Patent
Herchek et al.

(10) Patent No.: US 10,173,298 B2
(45) Date of Patent: Jan. 8, 2019

(54) REVERSIBLE LEVER FOR A GUARD ASSEMBLY FOR A POWER TOOL

(71) Applicant: Black & Decker Inc., New Britain, CT (US)

(72) Inventors: Jennifer L. Herchek, Towson, MD (US); Earnest N. Copeland, Jr., Perry Hall, MD (US); Robert J. Cirincione, II, Towson, MD (US)

(73) Assignee: Black & Decker Inc., New Britain, CT (US)

( * ) Notice: Subject to any disclaimer, the term of this patent is extended or adjusted under 35 U.S.C. 154(b) by 74 days.

(21) Appl. No.: 15/499,971

(22) Filed: Apr. 28, 2017

(65) Prior Publication Data

US 2017/0320192 A1 Nov. 9, 2017

Related U.S. Application Data

(60) Provisional application No. 62/332,761, filed on May 6, 2016.

(51) Int. Cl.
*B24B 55/05* (2006.01)
*B24B 23/02* (2006.01)
(Continued)

(52) U.S. Cl.
CPC ............ *B24B 55/052* (2013.01); *B23Q 11/08* (2013.01); *B24B 23/028* (2013.01); *B25F 5/02* (2013.01)

(58) Field of Classification Search
CPC ..... B24B 55/052; B24B 55/04; B24B 23/028; B24B 23/00; B23Q 11/08; B25F 5/022
(Continued)

(56) References Cited

U.S. PATENT DOCUMENTS 3,334,448 A * 8/1967 Alexander ............ B24B 23/022
188/69
4,574,649 A 3/1986 Seol
(Continued)

FOREIGN PATENT DOCUMENTS

DE 3913898 10/1990
DE 10158334 2/2003
EP 1618990 1/2006

OTHER PUBLICATIONS

Extended EP Search Report dated Jul. 28, 2017 issued in corresponding EP patent application No. 17168351.9.
(Continued)

*Primary Examiner* — George Nguyen
(74) *Attorney, Agent, or Firm* — Amir Rohani

(57) ABSTRACT

A stop lever is provided for a power tool having a gear case and a guard member. The reversible stop lever is coupled to the gear case via a fastener. The stop lever includes a first arm and a second arm, and the fastener is removable to position the stop lever such that the first arm or the second arm of the stop lever engages the guard collar. The first arm includes a first surface and a second surface that are angled such that the guard collar can be rotated in a one direction without actuation of the second arm, but not in the opposite direction. The second arm of the stop lever includes surfaces that are angled to prevent rotation of the guard collar in either direction unless the second arm is actuated about the fastener.

11 Claims, 8 Drawing Sheets

(51) Int. Cl.
*B25F 5/02* (2006.01)
*B23Q 11/08* (2006.01)

(58) Field of Classification Search
USPC .................................. 451/357–359, 451–457
See application file for complete search history.

(56) References Cited

U.S. PATENT DOCUMENTS

| | | | |
|---|---|---|---|
| 4,924,635 | A | 5/1990 | Rudolf |
| 5,075,976 | A | 12/1991 | Young |
| 5,384,985 | A | 1/1995 | Jacobsson |
| 5,637,035 | A | 6/1997 | Yee |
| 6,893,334 | B1 | 5/2005 | Stivers |
| 6,988,939 | B2 | 1/2006 | Hofmann |
| 7,059,947 | B2 | 6/2006 | Crover |
| 7,063,606 | B2 | 6/2006 | Stierle |
| 7,131,897 | B2 | 11/2006 | Crover |
| 7,311,589 | B2 | 12/2007 | Wiker |
| 7,524,239 | B2 | 4/2009 | Schmidberger-Brinek |
| 7,892,075 | B2 | 2/2011 | Esenwein |
| 8,221,197 | B2 | 7/2012 | Boeck et al. |
| 8,231,436 | B2 | 7/2012 | Boeck et al. |
| 8,282,446 | B2 | 10/2012 | Sulea et al. |
| 8,454,412 | B2 | 6/2013 | Esenwein |
| 8,512,104 | B2 | 8/2013 | Nagy |
| 8,905,824 | B2 | 12/2014 | Copeland, Jr. et al. |
| 9,120,202 | B2 | 9/2015 | Kelleher et al. |
| 2007/0117499 | A1 | 5/2007 | Chen |
| 2008/0280549 | A1 | 11/2008 | Sulea |
| 2009/0029635 | A1 | 1/2009 | Boeck |
| 2009/0100885 | A1 | 4/2009 | Boeck |
| 2009/0130961 | A1 | 5/2009 | Boeck |
| 2009/0209184 | A1* | 8/2009 | Esenwein ............ B24B 23/028 451/451 |
| 2009/0311953 | A1 | 12/2009 | Maute |
| 2010/0105300 | A1 | 4/2010 | Esenwein |
| 2010/0178857 | A1 | 7/2010 | Esenwein |
| 2012/0270480 | A1* | 10/2012 | Rohde .................... B23D 45/16 451/451 |

OTHER PUBLICATIONS

Non Final Office Action dated Dec. 13, 2013 issued in corresponding application.
Notice of Allowance dated Mar. 27, 2014 issued in corresponding application.
Notice of Allowance dated Aug. 4, 2014 issued in corresponding application.
Corrected Notice of Allowability dated Oct. 9, 2014 issued in corresponding application.
Notice of Allowance dated Apr. 24, 2015 issued in corresponding application.
Non Final Office Action dated Mar. 21, 2017 issued in corresponding application.

* cited by examiner

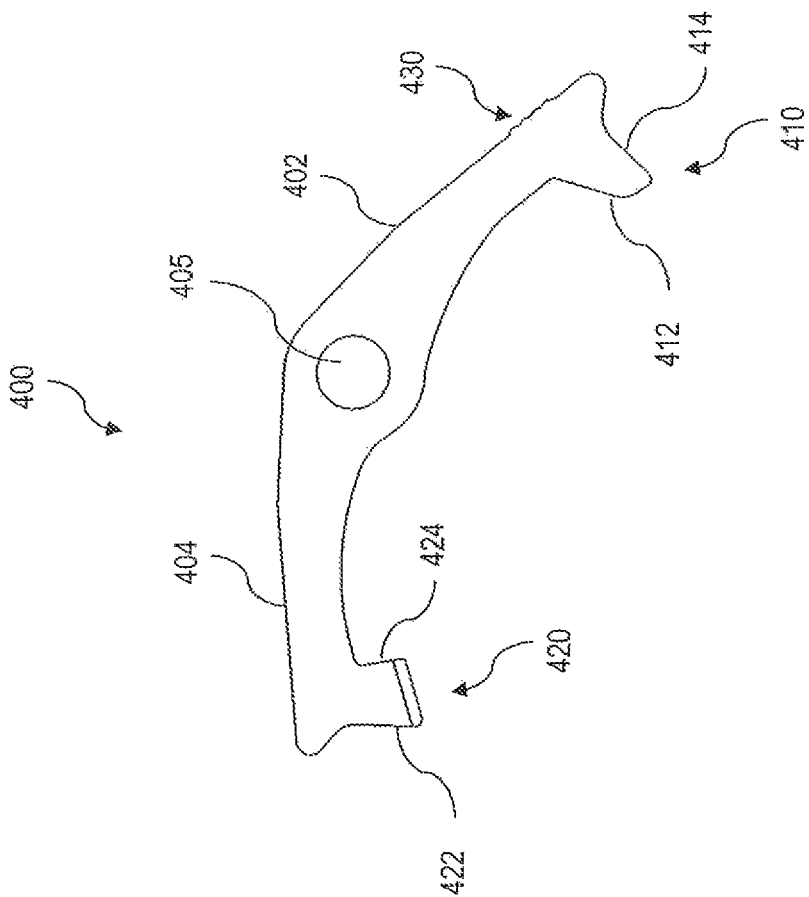
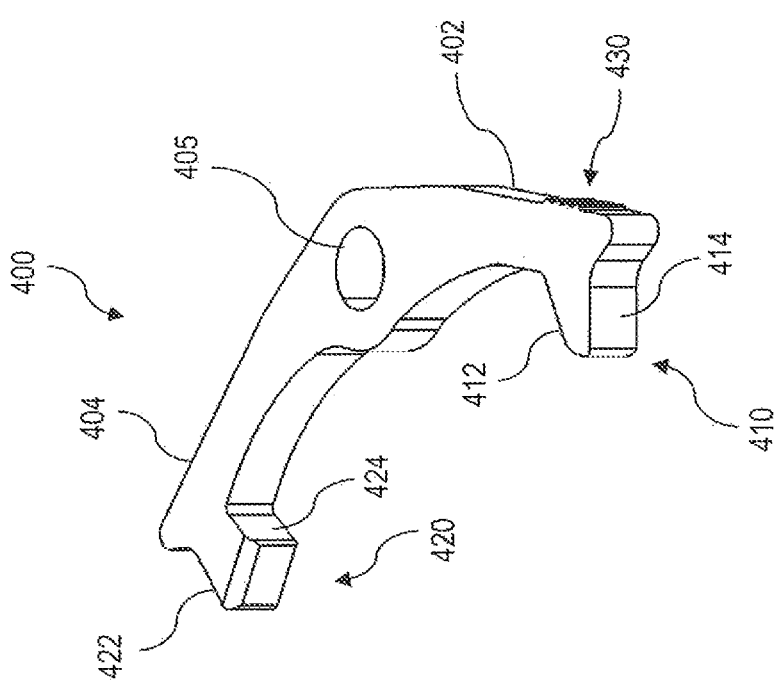
FIG. 6B
FIG. 6A

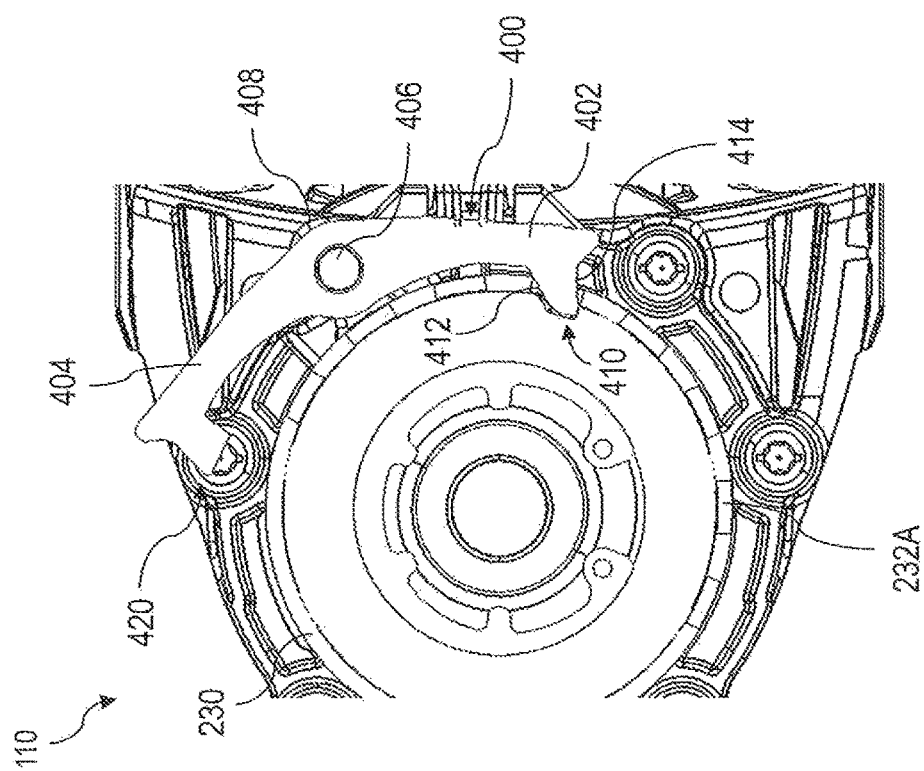

REVERSIBLE LEVER FOR A GUARD ASSEMBLY FOR A POWER TOOL

RELATED APPLICATION

This application claims the benefit of U.S. Provisional Patent Application No. 62/332,761, filed May 6, 2016, which is incorporated herein by reference in its entirety.

FIELD OF THE DISCLOSURE

This disclosure relates to power tools. More particularly, the present invention relates to a stop lever for a guard assembly of a power tool.

BACKGROUND

Angle grinders may be used for various grinding and cutting operations. Various types of grinding or cutting wheels can be used and mounted on the grinder spindle. Grinding wheel guards, such as type-27 guards, are provided for grinding operations and cover approximately 180 degrees of the wheel periphery, but leave the outer surface of the wheel substantially exposed. This allows the grinding wheel to be mounted onto the tool spindle rather easily. Conventional cutting wheel guards, such as type-1 guards provided for cutting operations, cover approximately 180 degrees of the wheel periphery and approximately half of each both surfaces of the wheel. This arrangement is needed b/c cutting wheels are more likely to break, fly off the spindle, or shatter during a cutting operation. Conventional cutting guards are thick enough to allow the user to insert the wheel inside the guard at an angle and mount the wheel onto the grinder spindle. However, such cutting guards block a substantial part of the user's field of vision over the work piece.

U.S. Pat. No. 8,905,824, which is incorporated herein by reference in its entirety, describes a guard assembly for abrasive accessory of an angle grinder that is selectively adjustable and repositionable with respect to the working tool. This provides the user to adjust the angular position of the shield assembly as desired. The '824 patent also describes a stop lever that permits the guard assembly to rotate in one direction (e.g., clockwise) without the user having to engage the lever, but in the other direction (e.g., counter-clockwise) only when the lever is engaged by the user. This stop lever is preferable by some users, particularly in grinding operations, where quick adjustment of the guard assembly increase user efficiency. Some users, however, prefer a lever that does not allow the guard to rotate in either direction without the lever is pressed. This is particularly true when using Type 1 accessories for cutting applications, where users tend to use the guard assembly as a leverage point to apply more force on the work piece.

SUMMARY

According to an embodiment of the invention, a power tool is provided comprising a gear case having a neck; a guard member having a body portion for at least partially surrounding a working member and a guard collar disposed around the neck of the gear case; and a reversible stop lever coupled to the gear case via a fastener about which the stop lever is pivotable. In an embodiment, the stop lever includes a first arm and a second arm, and the fastener is removable to position the stop lever such that the first arm or the second arm of the stop lever engages the guard collar. In an embodiment, the first arm of the stop lever includes a first surface and a second surface that are angled with respect to the guard collar such that, when the first arm engages a window of the guard collar, rotation of the guard collar is permitted in a first direction where the window engages the first surface of the first arm without actuation of the second arm about the fastener, but is prevented in a second direction where the window engages the second surface of the first arm unless the second arm is actuated about the fastener. In an embodiment, the second arm of the stop lever includes a first surface and a second surface that are angled such that, when the second arm engages a window of the guard collar, rotation of the guard collar in either direction is prevented unless the second arm is actuated about the fastener.

In an embodiment, the stop lever is substantially L-shaped.

In an embodiment, a biasing member is arranged to bias the first arm or the second arm of the stop lever into engagement with the guard collar.

In an embodiment, the guard collar includes windows disposed around the neck of the gear case.

In an embodiment, the stop lever engages the neck of the gear case when aligned with one of the windows.

In an embodiment, the guard collar includes tabs, the neck includes a track, and the tabs slide along the track as the guard collar rotates around the neck.

In an embodiment, the power tool is a grinder.

In an embodiment, at least one of the first arm or the second arm includes one or more identifying notches.

In an embodiment, the first surface of the first arm is angled with respect to the guard collar such that the first surface comes into contact and slides out of the window when the guard collar rotates in the first direction.

In an embodiment, the second surface of the first arm is angled with respect to the guard collar such that the second surface comes into contact and blocks the window when the guard collar rotates in the second direction.

In an embodiment, the first and second surfaces of the second collar are angled with respect to the guard collar such that the first and second surfaces respectively come into contact and block the window when the guard collar rotates in the first or the second direction.

BRIEF DESCRIPTION OF THE DRAWINGS

The drawings described herein are for illustration purposes only and are not intended to limit the scope of this disclosure in any way.

FIGS. 6A and 6B depict perspective and side views of a reversible stop lever, according to an embodiment;

FIG. 7 depicts a bottom view of the gear case having the reversible stop lever in a "one-touch" position, according to an embodiment.

DESCRIPTION

Figure 1:
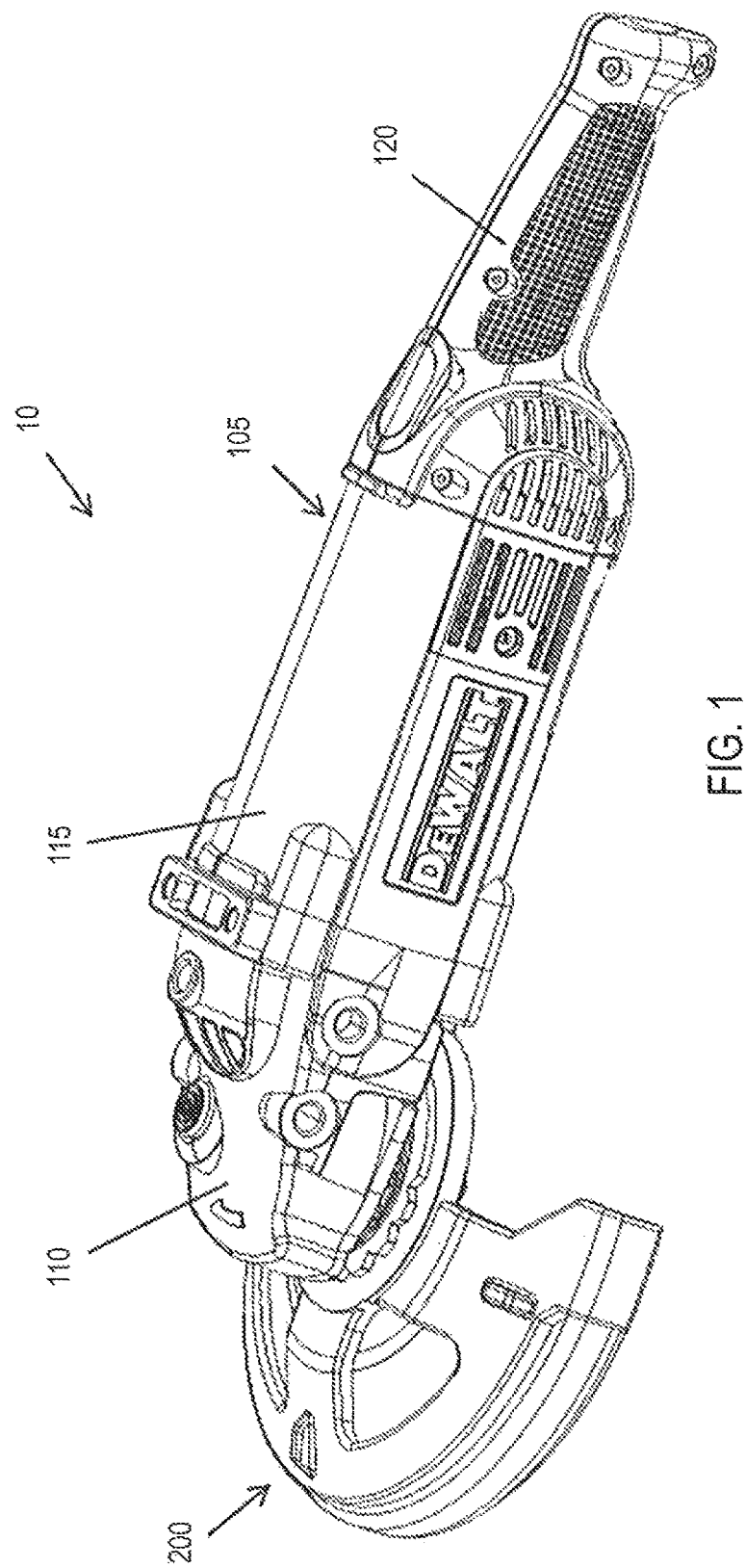
FIG. 1 depicts an exemplary power tool having a guard assembly, according to an embodiment of the invention.

FIG. 1 illustrates a perspective view of a handheld power tool device including a shield assembly in accordance with an embodiment of the invention. In an embodiment, the handheld tool device is a powered device with a dynamic working tool, e.g., an angle grinder including a grinding disc. As shown, the handheld power tool device 10 includes a housing 105 with a forward gear case 110, a field case 115 housing a motor or armature assembly oriented rearward of the gear case, and a handle assembly 120 oriented rearward of the field case. A shield or guard assembly 200, coupled to the gear case 110 of the device 10, is configured to shield the operator from debris (sparks/particles) generated during device operation.

Figure 2:
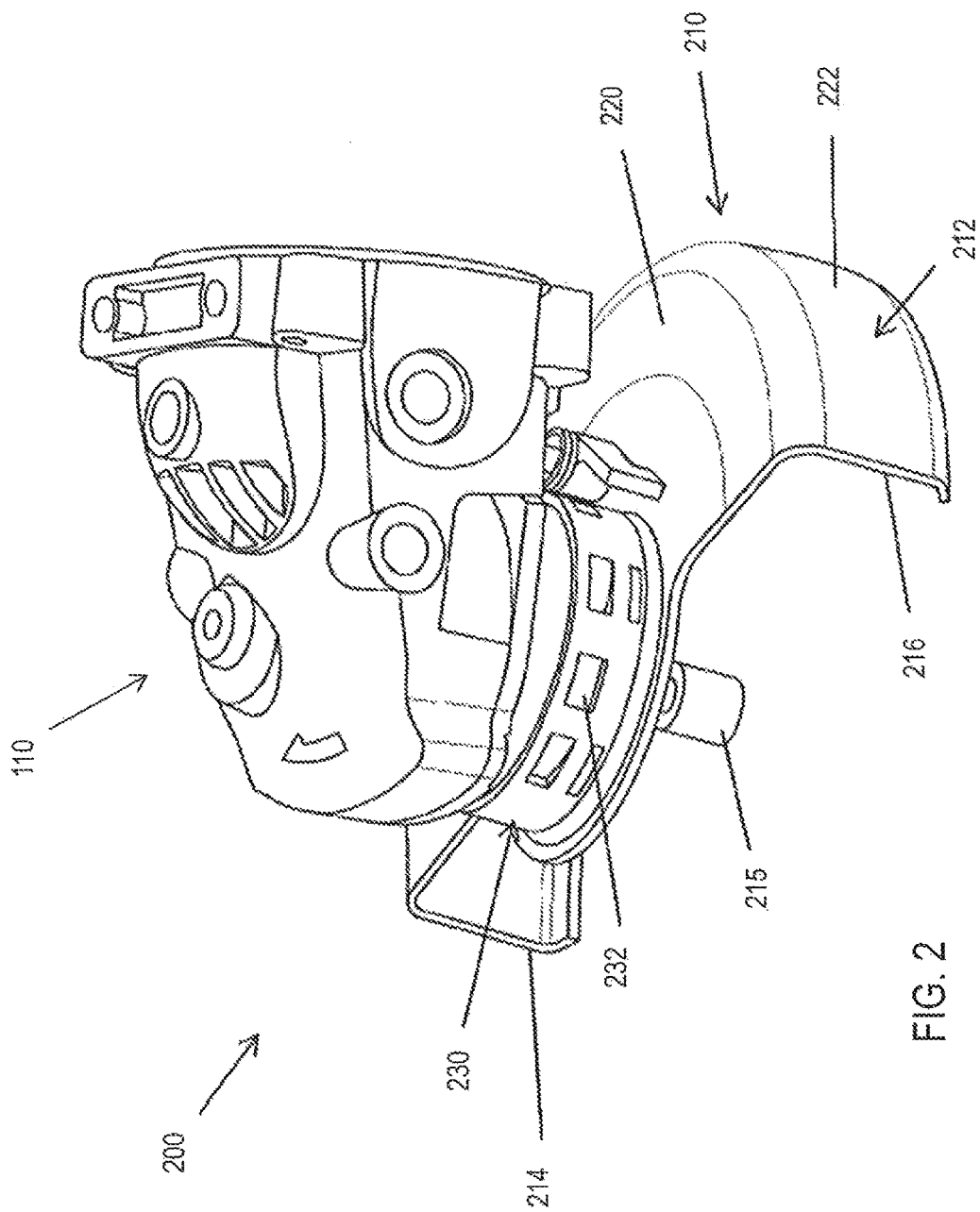
FIG. 2 depicts a perspective view of an exemplary guard assembly for the power tool, according to an embodiment.
Figure 3:
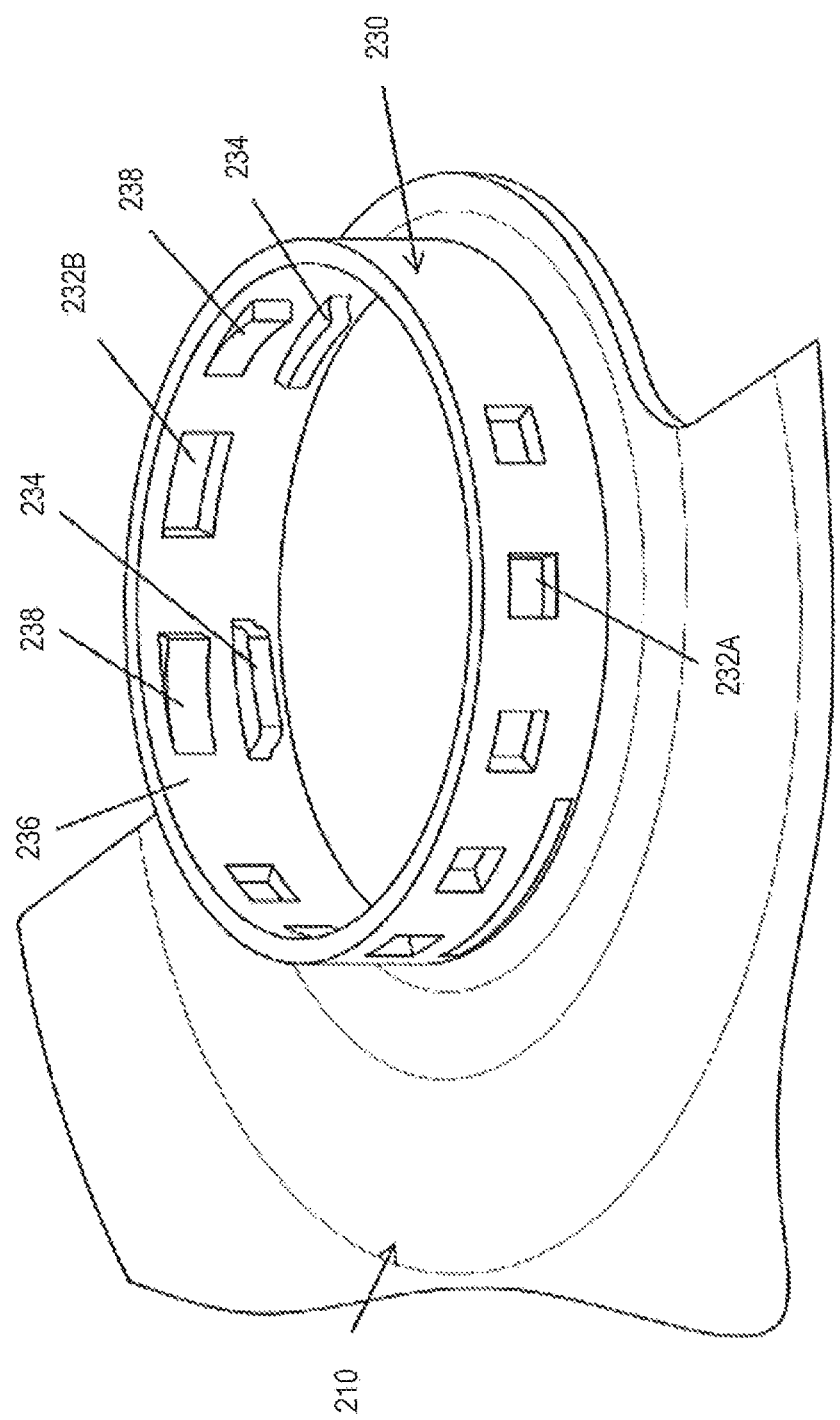
FIG. 3 depicts a perspective view of a guard collar of the guard assembly, according to an embodiment.
Figure 4:
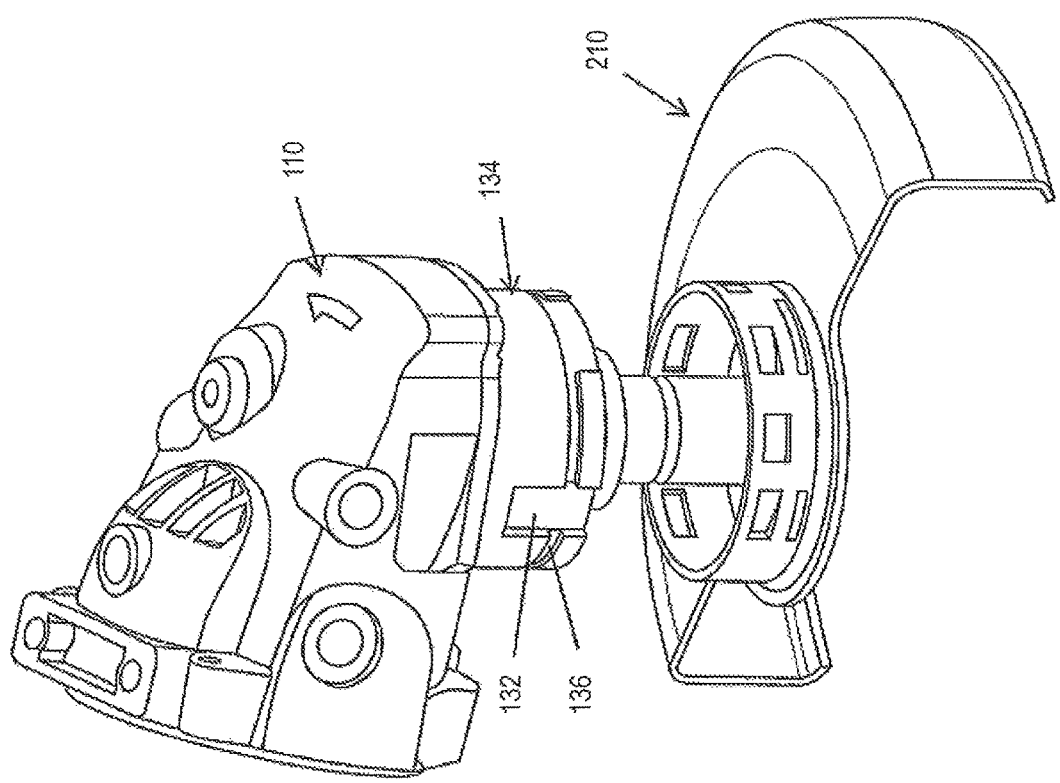
FIG. 4 depicts a partially exploded view of the guard assembly and the power tool gear case, according to an embodiment.

FIGS. 2-4 depict an exemplary guard assembly 200, according to an embodiment. As shown in FIG. 2, the guard assembly 200 includes a guard member 210 including a generally semicircular body 212 defining a first end 214 and a second end 216. The guard member 210 includes a generally planar base portion 220 oriented generally orthogonal to the rotational axis of tool spindle 215 and a transverse portion 222 oriented generally parallel to the rotational axis of the spindle 215. A generally annular guard collar 230, extending upward from the guard member body 212, includes a plurality of windows 232 angularly spaced about the collar.

As shown in FIG. 3, by way of specific example, the guard collar 230 may include a single rear window 232A (disposed centrally along the rear semicircle defined by the collar) and a plurality of forward windows 232B (disposed along the forward semicircle of defined by the collar).

As seen best in FIGS. 3 and 4, the guard collar 230 further includes one or more guide tabs 234 angularly spaced along the interior surface 236 of the collar 230 (e.g., disposed proximate the lower edge of the collar). The guide tabs 234 are received in and travel along an axial notch 132 formed into a neck 134 of the gear case 130 of the gear case 110. The guide tabs 234, moreover, move along a track 136 formed into the circumference of the neck 134.

In addition, the guard collar 230 includes one or more guard springs 238 angularly spaced along guard collar interior surface 1335. In an embodiment, the guard springs 238 are generally vertically aligned with each guide tab 234, each being spaced laterally from a corresponding side of the rear guard collar windows 323B. The guard springs 238 are configured to remove clearance between the guard collar 230 and the neck 134 of the gear case 110.

Figure 5:
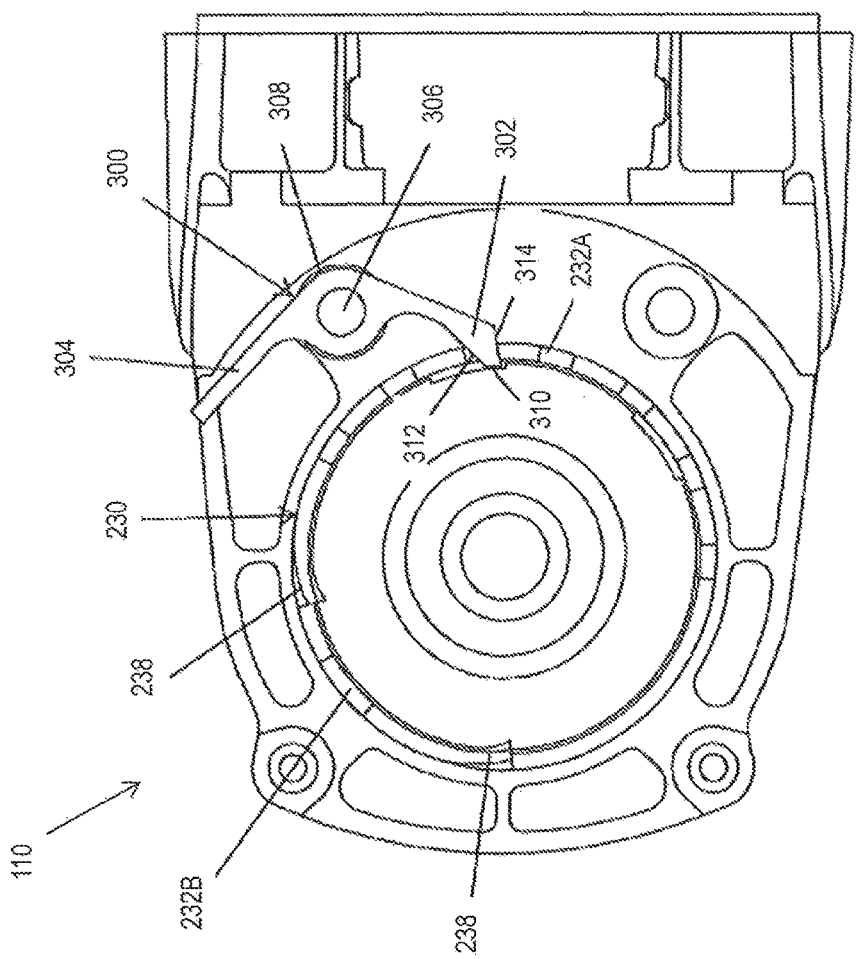
FIG. 5 depicts a bottom view of the gear case having a conventional stop lever.

Referring to FIG. 5, a bottom view of gear case 110 showing a conventional stop lever 300 (as disclosed in U.S. Pat. No. 8,905,824) is shown. Stop lever 300 shown herein is pivotably coupled to gear case 110 via a fastener 306. The stop lever 300 is biased into engagement with the guard collar 230 via a biasing member 308 such as a torsion spring. The stop lever 300 is generally L-shaped, including an engagement portion 302 and a distal arm portion 304. The engagement portion 302 is configured to pass through the windows 232A and 232B on the guard collar 230; moreover, the end 310 of the engagement portion 302 is asymmetrically tapered, with an angled or ramped surface 312 and a straight surface 314. With this configuration, when the engagement portion end 310 is positioned within a collar window 232A, 232B, rotation of the collar 230 is permitted in the direction of the angled surface 312, but is prevented in the direction of the straight surface 314. In a clockwise rotation of the collar 230, angled surface 312 engages and slides out of the collar windows 232A, 232B. In a counterclockwise rotation of the collar 230, the straight surface 314 engages and blocks the collar windows 232A, 232B unless the user presses on the distal arm portion 304.

In operation, the biasing member 308 (e.g., a torsion spring) biases the stop lever 300 (and, in particular, the engagement portion 302) into contact with the guard collar 230. In this normal, engaged or locked position, the engagement portion 302 is positioned within a collar window 232A, 232B, securing the rotational position of the guard collar 230 (and thus the shield assembly 200) relative to the working tool (e.g., a grinder disc). To reposition the guard member 210 (i.e., to adjust the rotational position of the shield assembly 200 with respect to the working tool), the user contacts the guard body end 214, 216 against a surface to rotate the guard member 210 in the direction of the stop lever angled surface 312 (e.g., clockwise in this example) with a force sufficient to overcome the biasing force of the biasing member 308. This, in turn, causes the guard collar 230 to rotate about the neck 134 of the gear case 110 in the direction of the angled surface 312 (e.g., clockwise), with the guide tabs 234 sliding along track 136. As the guard collar 230 rotates, the engagement portion 302 of the stop lever 300 is driven radially outward, i.e., it is pivoted away from the guard collar 230. The collar 230 continues to rotate until the engagement portion 302 is aligned with and engages a subsequent window 232A, 232B. With this configuration, each window serves as a detent position, permitting a user to adjust the rotational position of the shield assembly 200 along the neck 134 in discrete increments. The user may do so in one rotational direction (herein the clockwise rotation) without engaging the distal arm portion 304, and in the other rotational direction (herein the counterclockwise rotation) only with pivotably pressing the distal arm portion 304.

As described above, the type of stop lever 300 described above is preferable by some users, particularly in grinding operations, where quick adjustment of the guard assembly increase user efficiency. In some other options, however, such as operations involving use of Type 1 accessories for cutting, where users tend to use the guard assembly 200 as leverage point to apply more force on the work piece, the users often prefer a lever that does not allow the guard to rotate in either direction without the lever being actively pressed by the user.

According to an embodiment of the invention, an improved stop lever 400 is provided, as described herein with reference to FIGS. 6A through 8.

Figure 8:
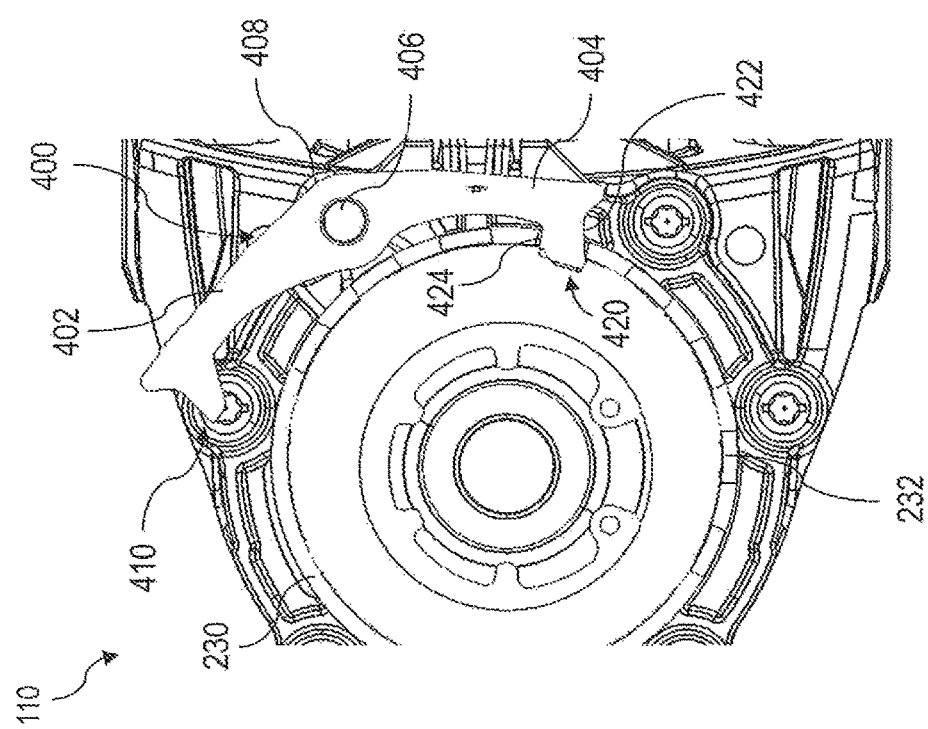
FIG. 8 depicts a bottom view of the gear case having the reversible stop lever in a "two-touch" position, according to an embodiment

FIGS. 6A and 6B depict perspective and top views of the stop lever 400. FIGS. 7 and 8 depict bottom views of the gear case 110 with the stop lever 400 assembled therein.

In an embodiment, stop lever 400 is similar to the stop lever described above in that it is attached at a pivot point 405 to gear case 110 via a fastener 406. Also, a biasing member 408 such as a spring biases the stop lever 400 into engagement with the guard collar 230. In this embodiment, however, stop lever 400 includes two arms 402, 404 disposed at an obtuse angle around the pivot point 406. The stop lever 400 is reversible such that the user may place either the first arm 402 or the second arm 404 in engagement with the guard collar 230, thus using the other of the second arm 404 or the first arm 402 as the distal arm that is actuated by the user.

FIG. 7 depicts an arrangement of the stop lever 400 where the first arm 402 is placed in engagement with the guard collar 230. In an embodiment, the first arm 402 includes an end 410 which is asymmetrically tapered, with an angled or ramped surface 412 and a straight surface 414. When the first arm 402 is positioned in engagement with the guard collar 230, rotation of the collar 230 is permitted in the direction of the angled surface 412 (in this example clockwise), where the angled surface 412 slides out of engagement with the windows 232 as the collar 230 rotates. The rotation of the collar 230 is prevented in the direction of the straight surface 414 (in this example counter-clockwise), where the straight surface 414 engage and blocks the windows 232 from rotation.

FIG. 8 depicts an arrangement of the stop lever 400 where the second arm 404 is placed in engagement with the guard collar 230. In an embodiment, second arm 404 includes an end 420 having two substantially straight surfaces 422 and 424. When the second arm 404 is positioned in engagement with the guard collar 230, rotation of the collar is prevented in both directions. Specifically, both straight surfaces 422 and 424 are disposed at an angle (e.g., close to a right angle or an obtuse angle) with respect to the collar 230 such that, once in engagement with a window 232 of the collar 230, the surfaces 422 and 424 will not slide out of engagement with the window 232 unless the user pivotably actuated the first arm 402.

In an embodiment, the first arm 402 is provided with one or more notch 430, which indicates to the user that the lever 400 is in its "two-touch" position, thus requiring the user to actuate the first arm 402 to rotate the collar 1320 in either direction. Similarly, the second arm 404 may be provided with one or more notches of a different pattern, which indicates to the user that the lever 400 is in its "one-touch" position, thus requiring the user to actuate the second arm 404 only in one rotation.

In operation, the user may position the stop lever 400 in such a way that either the first arm 402 or the second arm 404 is in engagement with the guard collar 230. The user may then fasten the stop lever 400 via fastener 406 received through the pivot point 405. The biasing member 408 (e.g., a torsion spring) biases the first arm 402 or the second arm 404 of the stop lever 400 into contact with the guard collar 230.

In the "two-touch" position, the end 420 of the second arm 404 is placed within a collar window 232, securing the rotational position of the guard collar 230 (and thud the shield assembly 200) relative to the working tool (e.g., the grinding disc). To reposition the guard member 210, the user must engage and pivot the first arm 402 such that the end 420 of the second arm 404 comes out of the respective collar window 232. The user may then contact and rotate the guard body end 214, 216 in either rotational direction. This, in turn, causes the guard collar 230 to rotate about the neck 134 of the gear case 110, until the user releases the first arm 402 of the stop lever 400, and the end 420 of the second arm 404 engages a subsequent window 232 of the guard collar 230.

In the "one-touch" position, the end 410 of the first arm 402 is placed within a collar window 232, securing the rotational position of the guard collar 230 (and thus the shield assembly 200) relative to the working tool. To reposition the guard member 210, the user contacts the guard body end 214, 216 in the direction of the stop lever angled surface 412 (e.g., clockwise in the example). This, in turn, causes the guard collar 230 to rotate about the neck 134 of the gear case 110 in the direction of the angle surface 412 (e.g., clockwise). As the guard collar 230 rotates, the first arm 402 of the stop lever 400 is driven radially outward, i.e., it is pivoted away from the guard collar 230. The collar 230 continues to rotate until the end 410 of the first arm 402 is aligned with and engages a subsequent window 232. The user may rotate the direction of the straight surface 414 (e.g., counter-clockwise) by actuating the second arm 404.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A power tool comprising:
a gear case having a neck;
a guard member having a body portion for at least partially surrounding a working member and a guard collar disposed around the neck of the gear case; and
a reversible stop lever coupled to the gear case via a fastener about which the stop lever is pivotable, the stop lever comprising a first arm and a second arm, the fastener being removable to position the stop lever such that the first arm or the second arm of the stop lever engages the guard collar;
wherein the first arm of the stop lever includes a first surface and a second surface that are angled with respect to the guard collar such that, when the first arm engages a window of the guard collar, rotation of the guard collar is permitted in a first direction where the window engages the first surface of the first arm without actuation of the second arm about the fastener, but is prevented in a second direction where the window engages the second surface of the first arm unless the second arm is actuated about the fastener, and
the second arm of the stop lever includes a first surface and a second surface that are angled such that, when the second arm engages a window of the guard collar, rotation of the guard collar in either direction is prevented unless the second arm is actuated about the fastener.

2. The power tool of claim 1, wherein the stop lever is substantially L-shaped.

3. The power tool of claim 1, further comprising a biasing member arranged to bias the first arm or the second arm of the stop lever into engagement with the guard collar.

4. The power tool of claim 1, wherein the guard collar comprises a plurality of windows disposed around the neck of the gear case.

5. The power tool of claim 4, wherein the stop lever engages the neck of the gear case when aligned with one of the plurality of windows.

6. The power tool of claim 1, wherein the guard collar includes tabs, the neck includes a track, and the tabs slide along the track as the guard collar rotates around the neck.

7. The power tool of claim 1, wherein the power tool is a grinder.

8. The power tool of claim 1, wherein at least one of the first arm or the second arm includes one or more identifying notches.

9. The power tool of claim 1, wherein the first surface of the first arm is angled with respect to the guard collar such that the first surface comes into contact and slides out of the window when the guard collar rotates in the first direction.

10. The power tool of claim 1, wherein the second surface of the first arm is angled with respect to the guard collar such that the second surface comes into contact and blocks the window when the guard collar rotates in the second direction.

11. The power tool of claim 1, wherein the first and second surfaces of the second collar are angled with respect to the guard collar such that the first and second surfaces respectively come into contact and block the window when the guard collar rotates in the first or the second direction.

* * * * *